US012757194B2

(12) United States Patent
Tiirola et al.

(10) Patent No.: US 12,757,194 B2
(45) Date of Patent: Oct. 6, 2026

(54) DETERMINING WAVEFORM FOR UPLINK TRANSMISSION

(71) Applicant: Nokia Technologies Oy, Espoo (FI)

(72) Inventors: Esa Tapani Tiirola, Oulu (FI); Marco Maso, Massy (FR); Nhat-Quang Nhan, Massy (FR); Alessio Marcone, Munich (DE); Amir Mehdi Ahmadian Tehrani, Munich (DE)

(73) Assignee: Nokia Technologies Oy, Espoo (FI)

( * ) Notice: Subject to any disclaimer, the term of this patent is extended or adjusted under 35 U.S.C. 154(b) by 272 days.

(21) Appl. No.: 18/475,549

(22) Filed: Sep. 27, 2023

(65) Prior Publication Data

US 2024/0114505 A1 Apr. 4, 2024

(30) Foreign Application Priority Data

Sep. 29, 2022 (FI) ..................................... 20225859

(51) Int. Cl.
*H04W 72/1268* (2023.01)
*H04W 52/36* (2009.01)
*H04W 72/0453* (2023.01)

(52) U.S. Cl.
CPC ..... *H04W 72/1268* (2013.01); *H04W 52/365* (2013.01); *H04W 52/367* (2013.01); *H04W 72/0453* (2013.01)

(58) Field of Classification Search
CPC ........... H04W 72/1268; H04W 52/365; H04W 52/367; H04W 72/0453; H04W 28/06;
(Continued)

(56) References Cited

U.S. PATENT DOCUMENTS

2018/0279292 A1 9/2018 Luo et al.
2020/0127787 A1 4/2020 Nory et al.
(Continued)

FOREIGN PATENT DOCUMENTS

EP 3598680 B1 11/2021
WO 2018/229736 A1 12/2018
WO 2021/047973 A1 3/2021

OTHER PUBLICATIONS

3GPP R4-2214008, "CR for 38.101-1: Correction of PC2 MPR and PC1.5 fallback to PC2 MPR" Aug. 26, 2022.*
(Continued)

*Primary Examiner* — Jae Y Lee
(74) *Attorney, Agent, or Firm* — Lippes Mathias LLP

(57) ABSTRACT

To enable dynamic waveform switching, one or more instructions on how to determine a waveform amongst at least a first waveform and a second waveform for at least one uplink transmission based at least on frequency domain resource allocation for the at least one uplink transmission may be transmitted in a network, or apparatuses may comprise one or more of the one or more instructions. The one or more instructions associate at least resource block regions with waveforms. The one or more instructions may be applied to determine, based on a frequency domain resource allocation for an uplink transmission, a waveform for the uplink transmission at least according to a resource block region in the frequency domain resource allocation. The waveform determined is then used in the uplink transmission.

18 Claims, 5 Drawing Sheets

(58) Field of Classification Search
CPC ..... H04W 72/04; H04W 72/12; H04W 72/23; H04W 72/232; H04L 5/0092; H04L 5/0044; H04L 1/08; H04L 5/0007; H04L 27/0008; H04L 5/0053; H04L 27/2601; H04L 27/2614
See application file for complete search history.

(56) References Cited

U.S. PATENT DOCUMENTS

| | | | | |
|---|---|---|---|---|
| 2020/0162225 | A1 | 5/2020 | Chen Larsson et al. | |
| 2022/0109594 | A1* | 4/2022 | Baldemair | H04W 52/028 |
| 2023/0071327 | A1* | 3/2023 | Hwang | H04W 52/383 |
| 2023/0085404 | A1* | 3/2023 | Park | H04W 52/367 455/522 |
| 2023/0209481 | A1* | 6/2023 | Hwang | H04W 52/36 |
| 2024/0214951 | A1* | 6/2024 | Yoshimura | H04W 52/146 |
| 2024/0215007 | A1* | 6/2024 | Yoshimura | H04W 72/0457 |
| 2025/0234340 | A1* | 7/2025 | Hasegawa | H04L 27/2601 |
| 2026/0032678 | A1* | 1/2026 | Jiao | H04W 72/0453 |

OTHER PUBLICATIONS

3GPP R4-2214008 (Year: 2022).*
"New WI: Further NR coverage enhancements", 3GPP TSG RAN Meeting #94e, RP-213579, Agenda: 8.6.1, China Telecom, Dec. 6-17, 2021, 5 pages.
"3rd Generation Partnership Project; Technical Specification Group Radio Access Network; NR; User Equipment (UE) radio transmission and reception; Part 1: Range 1 Standalone (Release 17)", 3GPP TS 38.101-1, V17.4.0, Dec. 2021, 626 pages.
"Summary on Rel-17 TEIs", 3GPP TSG RAN WG1 #106bis-e, R1-2109722, Agenda: 8.18, NTT Docomo Inc, Oct. 11-19, 2021, pp. 1-101.
"3rd Generation Partnership Project; Technical Specification Group Radio Access Network; NR; Radio Resource Control (RRC) protocol specification(Release 17)", 3GPP TS 38.331, V17.0.0, Mar. 2022, pp. 1-1221.
"5G; NR; User Equipment (UE) radio transmission and reception; Part 1: Range 1 Standalone (3GPP TS 38.101-1 version 16.4.0 Release 16)", ETSI TS 138 101-1 V16.4.0, Jul. 2020, 408 pages.
"3rd Generation Partnership Project; Technical Specification Group Radio Access Network; NR; Physical layer procedures for data (Release 17)", 3GPP TS 38.214, V17.1.0, Mar. 2022, pp. 1-225.
"NR Radio Frequency and co-existence", 3GPP TSG RAN WG4 Chairman, Workshop on 3GPP submission towards IMT-2020, RWS-180011, Samsung, Oct. 24-25, 2018, pp. 1-21.
Office action received for Finnish Patent Application No. 20225859, dated Feb. 24, 2023, 11 pages.
"Dynamic switching between DFT-s-OFDM and CP-OFDM", 3GPP TSG RAN WG1 #111, R1-2211597, Agenda: 9.14.3, Nokia, Nov. 14-18, 2022, 16 pages.
Extended European Search Report received for corresponding European Patent Application No. 23189152.4, dated Feb. 2, 2024, 8 pages.
Office action received for corresponding European Patent Application No. 23189152.4, dated Nov. 26, 2025, 6 pages.

* cited by examiner

DETERMINING WAVEFORM FOR UPLINK TRANSMISSION

TECHNICAL FIELD

Various example embodiments relate to wireless communications.

BACKGROUND

Communication systems are under constant development. The 5G, 5G-Advanced, and beyond future wireless networks aim to support a large variety of services with increasing demand in terms of data rate and throughput while providing a higher degree of reliability, keeping the overall system complexity affordable. One factor affecting how the aims are achieved is a waveform that will be used in an air interface. There exists a plurality of different waveforms. However, none of them is an optimal waveform for all use case scenarios.

SUMMARY

The independent claims define the scope.

According to an aspect there is provided an apparatus comprising: means for receiving or comprising one or more instructions relating to uplink transmissions and associating at least resource block regions with waveforms, wherein one resource block region is associated with one waveform of the waveforms, the waveforms comprising at least a first waveform and a second waveform; means for receiving information indicating a frequency domain resource allocation for an uplink transmission; means for applying the one or more instructions to determine a waveform for the uplink transmission at least according to a resource block region in the frequency domain resource allocation; and means for transmitting the uplink transmission using the waveform determined for the uplink transmission.

In embodiments, the one or more instructions further associate maximum power reductions with said at least the first waveform and the second waveform and the means for applying are configured to determine the waveform for the uplink transmission at least according to the resource block region in the frequency domain resource allocation and its maximum power reduction.

In embodiments, the one or more instructions further comprise at least one of the following additional instructions for the second waveform, the additional instructions comprising a first threshold for a number of contiguous resource blocks in the frequency domain resource allocation, or a second threshold for a power headroom, and the means for applying are configured to apply the at least one of the additional instructions when determining whether to select the second waveform.

In embodiments, the second threshold is associated with at least one of the first waveform or the second waveform, and the means for applying are configured to select the second waveform, when the power headroom is below the second threshold.

In embodiments, the one or more instructions associate at least one third threshold with a difference between a power reduction of the first waveform and a power reduction of the second waveform and the means for applying are configured to determine the waveform for the uplink transmission to be the second waveform in response to the difference being larger than the third threshold.

In embodiments, the one or more instructions comprises a plurality of third thresholds associated with different modulation schemes, a third threshold being associated with one or more modulation schemes.

In embodiments, the means for applying are configured to apply the one or more instructions when the information indicating the frequency domain resource allocation for the uplink transmission is for a predetermined radio network temporary identification information.

In embodiments, the means for applying are configured to apply the one or more instructions when a number of repetitions of a transport block is greater than or equal to a fourth threshold.

In embodiments, the means for applying are configured to apply the one or more instructions based on previous downlink control information.

According to an aspect there is provided apparatus comprising: means for transmitting to at least one receiving apparatus, or means for comprising for the at least one receiving apparatus, one or more instructions relating to uplink transmissions and associating at least resource block regions with waveforms, wherein one resource block region is associated with one waveform of the waveforms, the waveforms comprising at least a first waveform and a second waveform; means for transmitting to the receiving apparatus information indicating a frequency domain resource allocation for an uplink transmission from the receiving apparatus; means for applying the one or more instructions to determine a waveform used by the receiving apparatus for the uplink transmission at least according to a resource block region in the frequency domain resource allocation; and means for receiving the uplink transmission using the waveform determined for the uplink transmission.

In embodiments, the one or more instructions are included in radio resource control information.

In embodiments, the apparatus comprises at least one processor, and at least one memory including computer program code, wherein the at least one processor with the at least one memory and computer program code provide said means.

According to an aspect there is provided a method comprising: receiving or comprising one or more instructions relating to uplink transmissions and associating at least resource block regions with waveforms, wherein one resource block region is associated with one waveform of the waveforms, the waveforms comprising at least a first waveform and a second waveform; receiving information indicating a frequency domain resource allocation for an uplink transmission; applying the one or more instructions to determine a waveform for the uplink transmission at least according to a resource block region in the frequency domain resource allocation; and transmitting the uplink transmission using the waveform determined for the uplink transmission.

According to an aspect there is provided a method comprising: transmitting to at least one receiving apparatus, or comprising for the at least one receiving apparatus, one or more instructions relating to uplink transmissions and associating at least resource block regions with waveforms, wherein one resource block region is associated with one waveform of the waveforms, the waveforms comprising at least a first waveform and a second waveform; transmitting to the receiving apparatus information indicating a frequency domain resource allocation for an uplink transmission from the receiving apparatus; applying the one or more instructions to determine a waveform used by the receiving apparatus for the uplink transmission at least according to a resource block region in the frequency domain resource allocation; and receiving the uplink transmission using the waveform determined for the uplink transmission.

According to an aspect there is provided a computer readable medium comprising program instructions stored thereon for at least one of a first functionality or a second functionality, for performing corresponding functionality: wherein the first functionality comprises at least: receiving or comprising one or more instructions relating to uplink transmissions and associating at least resource block regions with waveforms, wherein one resource block region is associated with one waveform of the waveforms, the waveforms comprising at least a first waveform and a second waveform; receiving information indicating a frequency domain resource allocation for an uplink transmission; applying the one or more instructions to determine a waveform for the uplink transmission at least according to a resource block region in the frequency domain resource allocation; and transmitting the uplink transmission using the waveform determined for the uplink transmission, and wherein the second functionality comprises at least: transmitting to at least one receiving apparatus, or comprising for the at least one receiving apparatus, the one or more instructions relating to uplink transmissions and associating at least resource block regions with waveforms, wherein one resource block region is associated with one waveform of the waveforms, the waveforms comprising at least a first waveform and a second waveform; transmitting to the receiving apparatus the information indicating the frequency domain resource allocation for the uplink transmission from the receiving apparatus; applying the one or more instructions to determine the waveform used by the receiving apparatus for the uplink transmission at least according to the resource block region in the frequency domain resource allocation; and receiving the uplink transmission using the waveform determined for the uplink transmission.

In embodiments, the medium is a non-transitory computer readable medium.

According to an aspect there is provided a computer program comprising instructions for causing an apparatus to perform at least one of a first functionality, or a second functionality, wherein the first functionality comprises at least: receiving or comprising one or more instructions relating to uplink transmissions and associating at least resource block regions with waveforms, wherein one resource block region is associated with one waveform of the waveforms, the waveforms comprising at least a first waveform and a second waveform; receiving information indicating a frequency domain resource allocation for an uplink transmission; applying the one or more instructions to determine a waveform for the uplink transmission at least according to a resource block region in the frequency domain resource allocation; and transmitting the uplink transmission using the waveform determined for the uplink transmission, and wherein the second functionality comprises at least: transmitting to at least one receiving apparatus, or comprising for the at least one receiving apparatus, the one or more instructions relating to uplink transmissions and associating at least resource block regions with waveforms, wherein one resource block region is associated with one waveform of the waveforms, the waveforms comprising at least a first waveform and a second waveform; transmitting to the receiving apparatus the information indicating the frequency domain resource allocation for the uplink transmission from the receiving apparatus; applying the one or more instructions to determine the waveform used by the receiving apparatus for the uplink transmission at least according to the resource block region in the frequency domain resource allocation; and receiving the uplink transmission using the waveform determined for the uplink transmission.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are only presented as examples. Although the specification may refer to "an", "one", or "some" embodiment(s) and/or example(s) in several locations, this does not necessarily mean that each such reference is to the same embodiment(s) or example(s), or that a particular feature only applies to a single embodiment and/or single example. Single features of different embodiments and/or examples may also be combined to provide other embodiments and/or examples. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first waveform could be termed a second waveform, and similarly, a second waveform could be also termed a first waveform without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G, 5G-Advanced), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
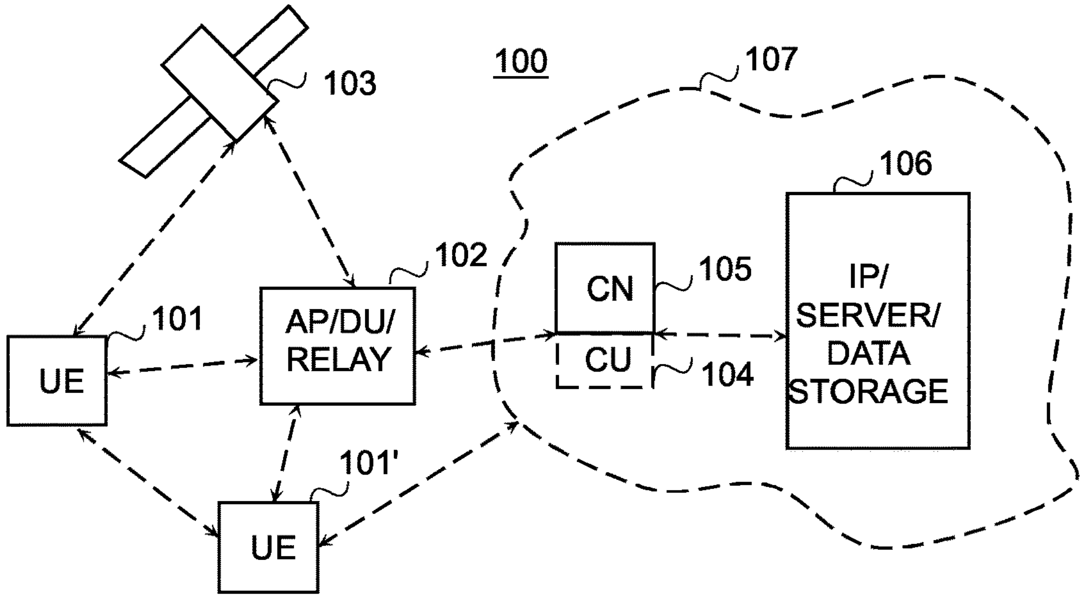
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels in a cell with an access node (such as (e/g)NodeB) providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or user plane function (UPF), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a computing device (e.g. a portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The user device may also utilize cloud. In some applications, a user device may comprise a user portable device with radio parts (such as a watch, earphones, eyeglasses, other wearable accessories or wearables) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. Further, it should be appreciated that a number of reception and/or transmission antennas in a user device may vary according to implementation and/or type of the user device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilize services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into a radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real-time functions being carried out at the RAN side (in a distributed unit, DU 102) and non-real-time functions being carried out in a centralized manner (in a central unit, CU 104). Another example of distribution, the open RAN, includes also disaggregation of certain functionalities between a distributed unit and one or more radio units (illustrated as one entity, DU&RU 102).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

5G networks, and it is envisaged that 6G networks and beyond, support two or more different waveforms for uplink transmissions. For example, the 5G-Advanced network may semi-statically configure, as a part of radio resource control configuration of an apparatus, for example, a waveform for uplink transmissions. Since the waveform semi-statically configured may not be an optimal waveform for a specific scenario, it is envisaged that a waveform may be dynamically determined (selected) based on an implicit indication, for example as illustrated with FIGS. 2 to 10. It should be appreciated that the different examples and solutions discussed herein with uplink transmissions may be implement with downlink transmissions as well.

Figure 2:
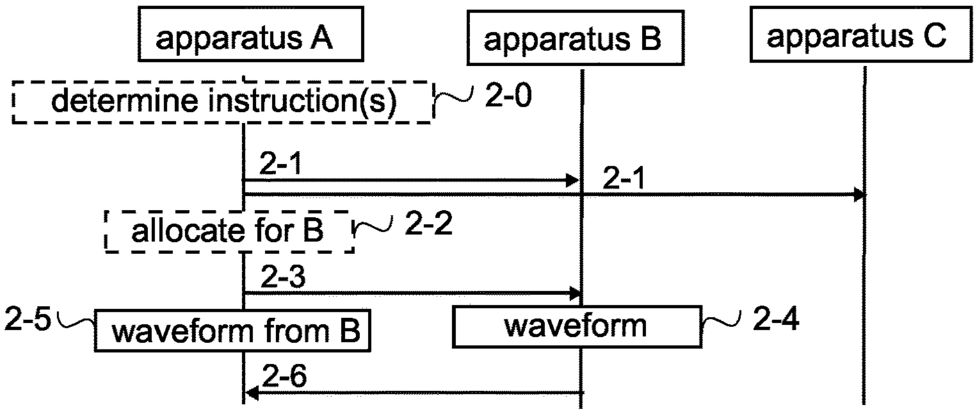
FIG. 2 illustrates an exemplified information exchange.

FIG. 2 illustrates an exemplified information exchange between different apparatuses in a radio network configured to support dynamic determination of a waveform amongst two or more waveforms for uplink transmissions. For the sake of clarity of the description, only three apparatuses that may communicate over an air interface are illustrated, one of them, "apparatus A", at least receiving uplink transmissions and transmitting downlink, the other two apparatuses, "apparatus B", "apparatus C", at least receiving downlink transmissions and transmitting uplink, without limiting the example to such a solution and apparatuses. The apparatus A may be, for example, an access point or a distributed unit, or any corresponding unit, examples of which are listed above with reference to block 102 in FIG. 1. The apparatus B and/or the apparatus C may be, for example, a user equipment, including wearables, vehicles, robotics, etc., further examples of which are listed above with reference to blocks 101, 101' in FIG. 1.

Referring to FIG. 2, the apparatus A may determine (block 2-0), for the apparatus B and/or the apparatus C, one or more instructions on how to determine a waveform amongst at least a first waveform and a second waveform for at least one uplink transmission based at least on frequency domain resource allocation for the at least one uplink transmission. Alternatively, the apparatus A may receive one or more of the one or more instructions, for example from a central unit. The one or more instructions may be determined, for example, based on a cell type (e.g. noise/coverage limited or interference limited scenario).

The one or more instructions associate at least resource block regions with waveforms. One resource block region is associated with one waveform of the waveforms. For example, a first waveform may be associated with an inner region and a second waveform with other regions, for example the second waveform may be associated with an edge region and an outer region.

The one or more instructions may comprise one or more additional instructions for the second waveform. For example, the one or more additional instruction may comprise a first threshold for a number of contiguous resource blocks in the frequency domain allocation, and/or a second threshold for a most recent power headroom. The most recent power headroom may be the last reported power headroom. The power headroom indicates a difference between a maximum uplink transmission power and an estimated uplink transmission power, or a difference between the maximum uplink transmission power and a last used uplink transmission power.

The one or more instructions may further associate at least one third threshold with a difference between a power reduction of the second waveform and a power reduction of the first waveform. The power reduction of a waveform may be a maximum power reduction or a total power reduction comprising the maximum power reduction and an additional power reduction. The one or more instructions may comprise a plurality of third thresholds associated with different modulation schemes, a third threshold being associated with one or more modulation scheme.

The apparatus A then transmits (messages 2-1) at least the one or more instructions, or information indicating or comprising at least the one or more instructions, to at least one receiving apparatus. In the illustrated examples, the one or more instructions, or said information is transmitted to the apparatus B and to the apparatus C. However, in another example the one or more instructions may be per a receiving apparatus, or per a subgroup of receiving apparatuses. The one or more instructions (at least one of the above listed examples of the instructions) may be included in radio resource control information configuring or reconfiguring the one or more receiving apparatuses. For example, one or more information elements in a search space configuration may carry the one or more instructions, or the one or more instructions may be part of a physical uplink shared channel configuration. Further, in case one or more thresholds are to be used, the one or more thresholds (one or more values for thresholds), or at least part of them, may be transmitted as part of the one or more instructions, or they may be preset to the apparatuses.

In implementations in which one or more of the one or more instructions are preset to apparatuses, i.e. the apparatuses comprise the one or more of the one or more instructions, messages 2-1 may carry indications whether to apply the one or more preset instructions, or which one of the one or more preset instructions to apply. In such implementations messages 2-1 may carry also one or more additional instructions.

As said above, in the illustrated example of FIG. 2, the apparatuses B and C both receive the information (messages 2-1) comprising said one or more instructions on how to determine a waveform amongst at least a first waveform and a second waveform for at least one uplink transmission based at least on frequency domain resource allocation for the at least one uplink transmission, wherein the one or more instructions associate at least resource block regions with waveforms.

In the illustrated example, a frequency domain for an uplink transmission from the apparatus B is allocated (block 2-2), for example by the apparatus A, or by the central unit, and information (message 2-3) indicating a frequency domain allocation for the uplink transmission from the apparatus B is transmitted from the apparatus A to the apparatus B.

The apparatus B then applies (block 2-4) the one or more instructions to determine a waveform for the uplink transmission. The waveform is determined at least according to a resource block region in the frequency domain allocation. For example, if the resource block region is within the inner region, the first waveform may be associated with an inner region and a second waveform with an outer region. The waveform may be determined according to the resource block region in the frequency domain allocation and its maximum power reduction. When the one or more instructions received in message 2-1 comprised one or more additional instructions, or one more thresholds, at least one of the additional instructions or thresholds may be applied when it is determined whether to select the second waveform. More detailed, non-limiting examples will be described below.

Since the apparatus A also has the same information, for example is aware of the one or more instructions, and the frequency domain allocation, the apparatus A determines (block 2-5) the waveform the apparatus B is to use in the uplink transmission in a similar manner as the apparatus B. Hence, the Apparatus A does not need to determine the waveform used by the Apparatus B (or the Apparatus C) blindly (i.e. based on two reception hypothesis).

The apparatus B transmits, using allocated resources, the uplink transmission (message 2-6) using the waveform determined in block 2-4, and the apparatus A receives the uplink transmission (message 2-6) using the waveform determined in block 2-5.

In another example the one or more instructions are preset to apparatuses, i.e. the apparatuses comprise the one or more instructions, and the above described block 2-0, and messages 2-1 are omitted, but otherwise determination of a waveform follows the above described process.

In the example of FIG. 2 it was assumed that the one or more instructions are applied, i.e. a waveform is determined, per a received/transmitted information indicating a frequency domain allocation for an uplink transmission. In some implementations the one or more instructions are applied when one or more conditions, or criteria, to apply them are fulfilled.

Figure 3:
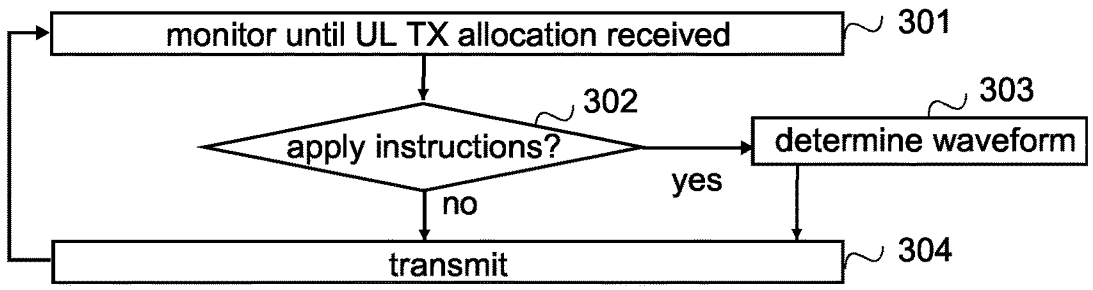
FIGS. 3 to 10 are flow charts illustrating example functionalities.

FIG. 3 illustrates an example functionality that may be performed by an apparatus, for example the apparatus B or C in the above example, after it has received the one or more instructions. Naturally, the apparatus A may determine the waveform using similar principles.

Referring to FIG. 3, the apparatus monitors (block 301), as configured, downlink transmissions until information indicating a frequency domain allocation for an uplink (UL) transmission (TX) is received. Then the apparatus determines (block 302), whether or not to apply the one or more instructions. For example, the apparatus may have been configured to apply the one or more instructions when the information on the frequency domain allocation for an uplink transmission is for a predetermined radio network temporary identification information, such as a radio network temporary identifier (RNTI), or for one of two or more predetermined radio network temporary identification information. The apparatus may have been configured to apply the one or more instructions when a number of repetitions of a transport block is greater than or equal to a threshold. Still a further example includes that the apparatus may have been configured to apply the one or more instructions to determine a waveform for the uplink transmission based on previous downlink control information, DCI. In further examples, the apparatus may have been configured to apply the instructions in case the previous waveform is the first waveform, or alternatively the second waveform. It should be appreciated that the above mentioned configuration examples when to apply the one or more instructions may be freely combined.

If the one or more instructions are to be applied (block 302: yes), the waveform is determined, for example as described above with FIG. 2, or will be described below with FIGS. 4 to 10, and the apparatus then transmits, using the allocated resources and the determined waveform, the uplink transmission in block 304.

If the one or more instructions are not to be applied (block 302: no), the apparatus transmits, using the allocated resources and the waveform configured semi-statically, the uplink transmission.

FIGS. 4 to 10 illustrate some non-limiting examples of functionality that may be performed by an uplink transmitting apparatus after it has received the one or more instructions, as described above with FIG. 2. It should be appreciated that an apparatus receiving uplink transmissions may perform similar procedure to determine a waveform that will use to receive one or more uplink transmissions. The examples are described using principles and terminology of 5G-Advanced technology without limiting the examples to 5G-Advanced, and the terminology used. Further, in the examples it is assumed, just for the sake of clarity of the description, that there are two waveforms, a cyclic prefix orthogonal frequency division multiplexing, CP-OFDM, and a discrete Fourier transform spread orthogonal frequency division multiplexing, DFT-s-OFDM. CP-OFDM can support multi-layer uplink transmissions but it is not optimal for coverage limited cases. DFT-s-OFDM is optimal for limited cases since it has a lower peak-to-average power ratio and requires smaller output power backoff, but it does not support multi-layer uplink transmissions and hence it is not optimal for scenarios that require high spectral efficiency. The two waveforms represent the at least two different waveforms having different maximum power reduction (MPR)/peak-to-average power ratio (PAPR) characteristics, for example high and low. Depending on a scenario these may be:

a) DFT-s-OFDM (lower MPR) and CP-OFDM (higher MPR),
b) DFT-s-OFDM with frequency domain spectral shaping and spectrum extension (lower MPR) and DFT-s-OFDM without frequency domain spectral shaping and spectrum extension (higher MPR),
c) CP-OFDM with tone reservation (lower MPR) and CP-OFDM (higher MPR).

In the below examples it is assumed that CP-OFDM is the first waveform, and it may be the waveform that is semi-statically configured, and DFT-s-OFDM is the second waveform, and it may be a default waveform since it is more robust in terms of coverage. (A default waveform may be preset to the apparatus, or it may be configured to the apparatus, and the default waveform may be different from the waveform that is semi-statically configured.) It should be appreciated that DFT-s-OFDM may be the first waveform and CP-OFDM may be the second waveform, meaning that principles disclosed below resulting to CP-OFDM would result to DFT-s-OFDM, and vice versa.

Figure 4:
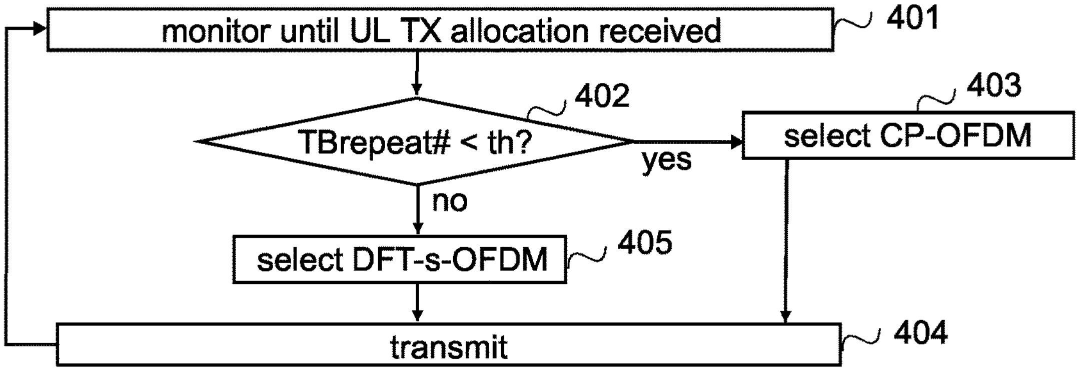

In the example illustrated in FIG. 4 the resource block region is associated with the waveforms by the size of the resource block region used for transport block repetition, i.e. based on the number of repetitions of a transport block, whereas in the examples illustrated in FIGS. 5 to 10, it is assumed that CP-OFDM (the first waveform) is associated with the inner region and DFT-s-OFDM (the second waveform) is associated with outer region and edge region, without limiting the examples illustrated in FIGS. 6 to 10 with the resource block region being associated with the inner/outer/edge region. A resource block (RB) allocation may be determined to be an inner resource block allocation, if following conditions are met:

$$RB_{Start,Low} \le RB_{Start} \le RB_{Start,High}, \text{ and}$$

$$L_{CRB} \le \text{ceil}(N_{RB}/2)$$

wherein $RB_{Start,Low}$ $RB_{Start,High}$ are values depending on subcarrier spacing and channel bandwidth, received as part of configuration or preset to the apparatus, $RB_{Start}$ is the lowest RB index of allocated resource blocks for uplink transmissions, $L_{CRB}$ is a number of allocated contiguous resource blocks, i.e. a transmission bandwidth which represents the length of a contiguous resource block allocation expressed in units of resources blocks, $N_{RB}$ is a transmission bandwidth configuration, expressed in units of resource blocks, and ceil(x) is the smallest integer greater than or equal to x.

Figure 11:
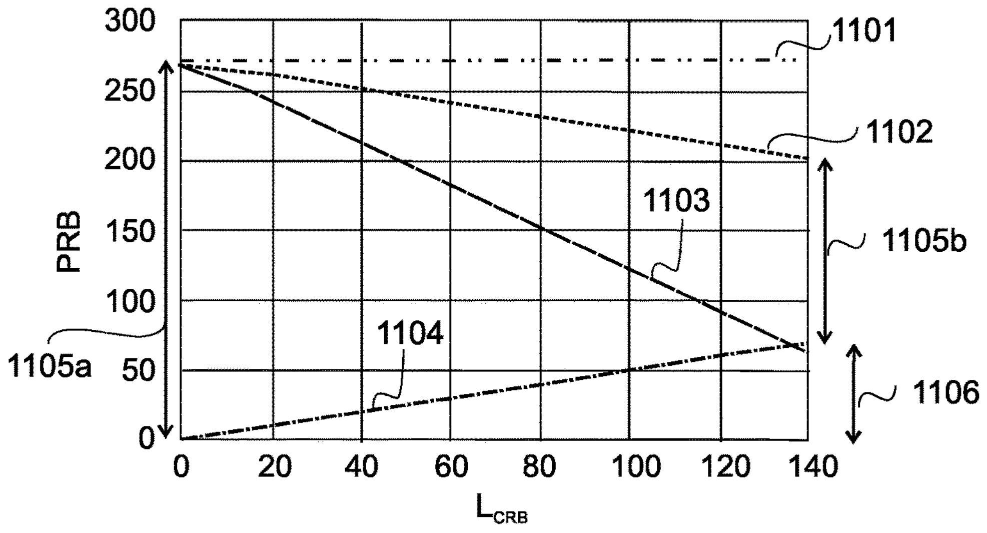
FIG. 11 illustrates an example of resource block regions.

FIG. 11 illustrates another example of resource block regions, the example being a chart for a scenario with a 30 kHz sub-carrier spacing and 100 MHz channel bandwidth. Similar approach may be applied to other scenarios. In the example chart of FIG. 11, y-axis depicts number of physical resource blocks, PRB, and the x-axis depicts $L_{CRB}$ (the number of allocated contiguous resource blocks). The chart has, starting from the upper part of the chart, a line 1101 for maximum resource blocks, a line 1102 for $RB_{Start,High+L\_CRB}$, a line 1103 for $RB_{Start,High}$ and a line 1104 for $RB_{Start,Low}$. The inner region, depicted at the borders of the chart by 1105*a* and 1105*b*, is between the lines 1102 and 1104, and the edge/outer region is below the line 1104, depicted by 1106 at the right border of the chart. In a typical scenario, MPR for inner region (a.k.a. Inner RB allocations) is smaller compared to that of outer/edge regions (a.k.a. Edge/Outer RB allocations).

Referring to FIG. 4, the apparatus monitors (block 401), as configured, downlink transmissions until information indicating a frequency domain allocation for an uplink (UL) transmission (TX) is received. The apparatus then determines, whether a number of repetitions of a transmission block (TBrepeat #) is below a threshold (th). If the number is not below the threshold (block 402: yes), CP-OFDM is selected in block 403 to be the waveform, which is used when data is transmitted in uplink (block 404). If the number is not below the threshold (block 402: no), DFT-s-OFDM is selected in block 403 to be the waveform, which is used when data is transmitted in uplink (block 404).

Figure 5:
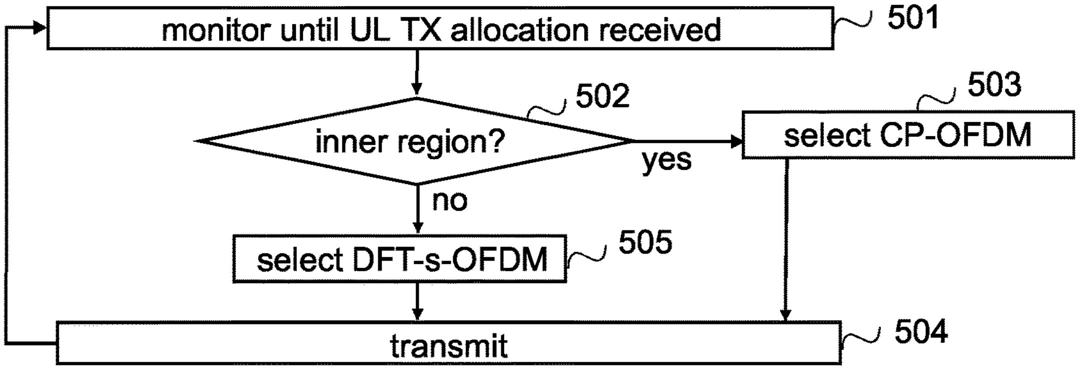

Referring to FIG. 5, the apparatus monitors (block 501), as configured, downlink transmissions until information indicating a frequency domain allocation for an uplink (UL) transmission (TX) is received. The apparatus then determines, whether the resource block region is the inner region. If the region is the inner region (block 502: yes), CP-OFDM is selected in block 503 to be the waveform, which is used when data is transmitted in uplink (block 504). If the region is not the inner region (block 502: no), DFT-s-OFDM is selected in block 503 to be the waveform, which is used when data is transmitted in uplink (block 504).

Figure 6:
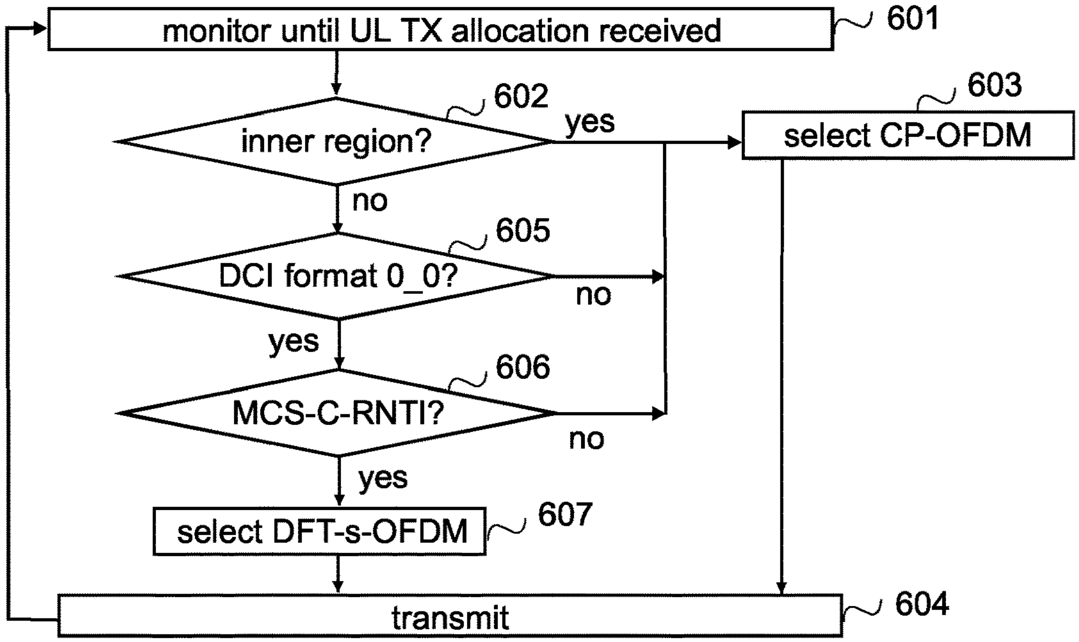

FIG. 6 illustrates an example relating to implementations in which implicit waveform determination may be configured separately per a downlink control information, DCI, format and/or per a radio network temporary identifier, RNTI, type. In the illustrated example, it is assumed that the implicit waveform switching is configured for DCI format 0_0 and for MCS-C-RNTI. It is straightforward to implement the example to solutions in which the implicit waveform switching is configured for either DCI format 0_0 or for MCS-C-RNTI.

Referring to FIG. 6, the apparatus monitors (block 601), as configured, downlink transmissions until information indicating a frequency domain allocation for an uplink (UL) transmission (TX) is received. The apparatus then determines, whether the resource block region is the inner region. If the region is the inner region (block 602: yes), CP-OFDM is selected in block 603 to be the waveform, which is used when data is transmitted in uplink (block 604). If the region is not the inner region (block 602: no), it is determined (block 605), whether the downlink control information is DCI format 0_0. If the downlink control information is not DCI format 0_0 (block 605: no), CP-OFDM is selected in block 603 to be the waveform, which is used when data is transmitted in uplink (block 604). If the downlink control information is DCI format 0_0 (block 605: yes), it is determined (block 606), whether a temporary identifier is MCS-C-RNTI. If the temporary identifier is not MCS-C-RNTI (block 606: no), CP-OFDM is selected in block 603 to be the waveform, which is used when data is transmitted in uplink (block 604). If the temporary identifier is MCS-C-RNTI (block 606: yes), DFT-s-OFDM is selected in block 607 to be the waveform, which is used when data is transmitted in uplink (block 604).

Figure 7:
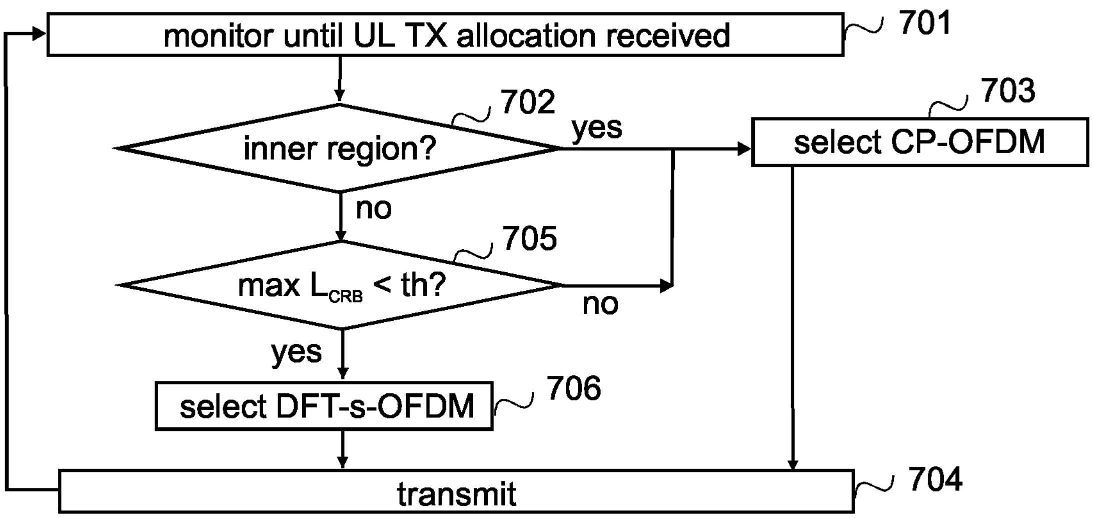

FIG. 7 illustrates an example relating to implementations in which a number of resource blocks allocated for the uplink transmission is taken into account.

Referring to FIG. 7, the apparatus monitors (block 701), as configured, downlink transmissions until information indicating a frequency domain allocation for an uplink (UL) transmission (TX) is received. The apparatus then determines, whether the resource block region is the inner region. If the region is the inner region (block 702: yes), CP-OFDM is selected in block 703 to be the waveform, which is used when data is transmitted in uplink (block 704). If the region is not the inner region (block 702: no), it is determined (block 705), whether the maximum number of allocated contiguous resource blocks, max $L_{CRB}$, is below (smaller than) a threshold, for example 20. If the number is not below the threshold (block 705: no), CP-OFDM is selected in block 703 to be the waveform, which is used when data is transmitted in uplink (block 704). If the number is below the threshold (block 705: yes), DFT-s-OFDM is selected in block 706 to be the waveform, which is used when data is transmitted in uplink (block 704).

Figure 8:
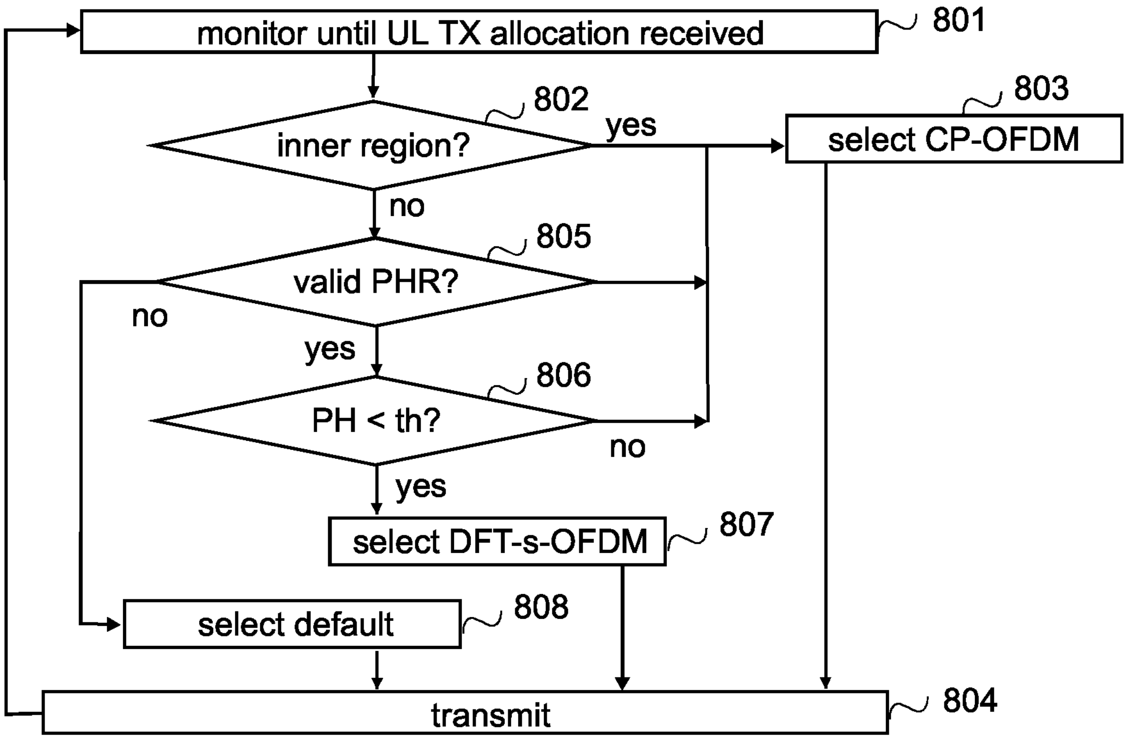

FIG. 8 illustrates an example relating to implementations in which a most previous uplink transmission power, reported to the network, may be taken into account. In the illustrated example, the power headroom is used to indicate the uplink transmission power.

Referring to FIG. 8, the apparatus monitors (block 801), as configured, downlink transmissions until information indicating a frequency domain allocation for an uplink (UL) transmission (TX) is received. The apparatus then determines, whether the resource block region is the inner region. If the region is the inner region (block 802: yes), CP-OFDM is selected in block 803 to be the waveform, which is used when data is transmitted in uplink (block 804). If the region is not the inner region (block 802: no), it is determined (block 805), whether there is a valid power headroom report. A valid power headroom report is a most recent power headroom report (PHR) that is not outdated, and that is available, or at least the power headroom is available and not outdated. If there is a valid power headroom report (block 805: yes), it is determined (block 806), whether the power headroom (PH) is below a threshold. If the power headroom is not below the threshold (block 806: no), CP-OFDM is selected in block 803 to be the waveform, which is used when data is transmitted in uplink (block 804). If the power headroom is below the threshold (block 806: yes), DFT-s-OFDM is selected in block 807 to be the waveform, which is used when data is transmitted in uplink (block 804). If there is no valid power headroom report (block 805: no), a default waveform is selected in block 808 to be the waveform, which is used when data is transmitted in uplink (block 804). The default waveform may be e.g. DFT-s-OFDM.

For example, if the configured, or current waveform is CP-OFDM, the apparatus switches to DFT-s-OFDM if PRH is smaller than M dB (M being the threshold value). The threshold value may also depend on configured waveform. For example, if the configured, or current waveform is DFT-s-OFDM, the apparatus continues to use DFT-s-OFDM if PRH is smaller than N dB (N being another threshold value than M).

Figure 9:
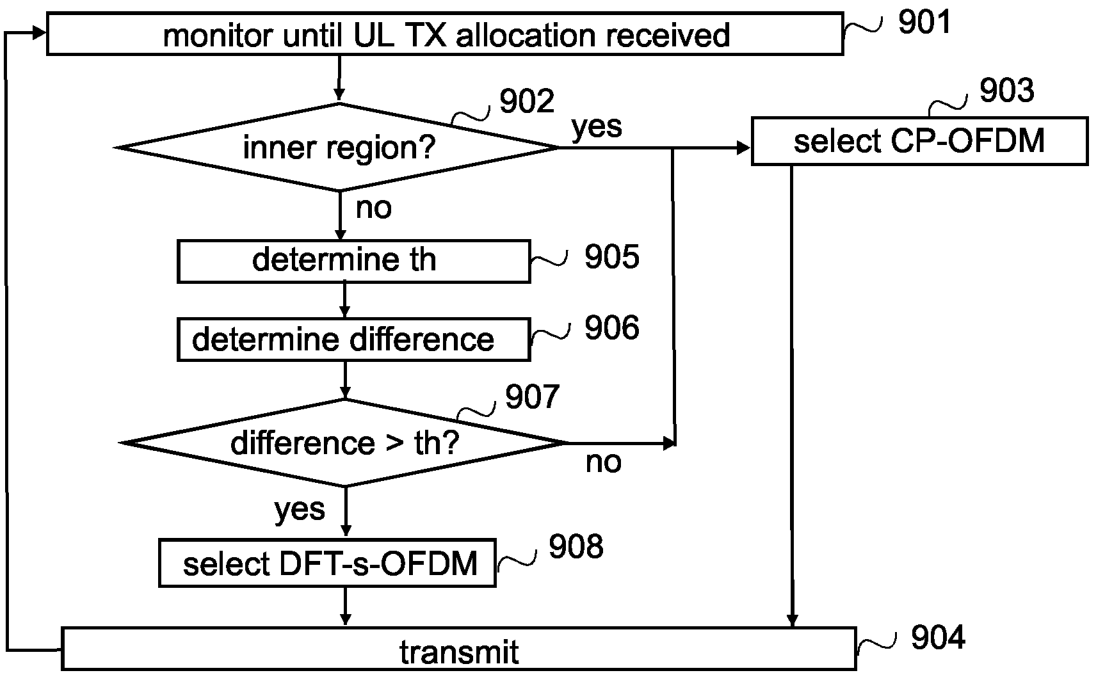

FIG. 9 illustrates an example relating to implementations in which power reductions, for example maximum power reductions and/or combinations of maximum power reductions and additional power reductions may be taken into account, and in which one common threshold (threshold value) may be used or in which thresholds (threshold values) may be defined separately for different modulation schemes. In the example of FIG. 9, the maximum power reductions, MPRs, are used for the sake of clarity.

Referring to FIG. 9, the apparatus monitors (block 901), as configured, downlink transmissions until information indicating a frequency domain allocation for an uplink (UL) transmission (TX) is received. The apparatus then determines, whether the resource block region is the inner region.

If the region is the inner region (block 902: yes), CP-OFDM is selected in block 903 to be the waveform, which is used when data is transmitted in uplink (block 904). If the region is not the inner region (block 902: no), in the illustrated example, a threshold (th), or more precisely, a value for a threshold is determined in block 905 based on a modulation and coding scheme to be used for the uplink transmission. Further, a difference, or delta, between MPR of CP-OFDM and MPR of DFT-s-OFDM is determined in block 906. Then it is determined (block 907), whether the difference is larger than the threshold. If the difference (delta) is not larger than the threshold (block 907: no), CP-OFDM is selected in block 903 to be the waveform, which is used when data is transmitted in uplink (block 904). If the difference, or delta, is larger than the threshold (block 907: yes), DFT-s-OFDM is selected in block 908 to be the waveform, which is used when data is transmitted in uplink (block 904).

Figure 10:
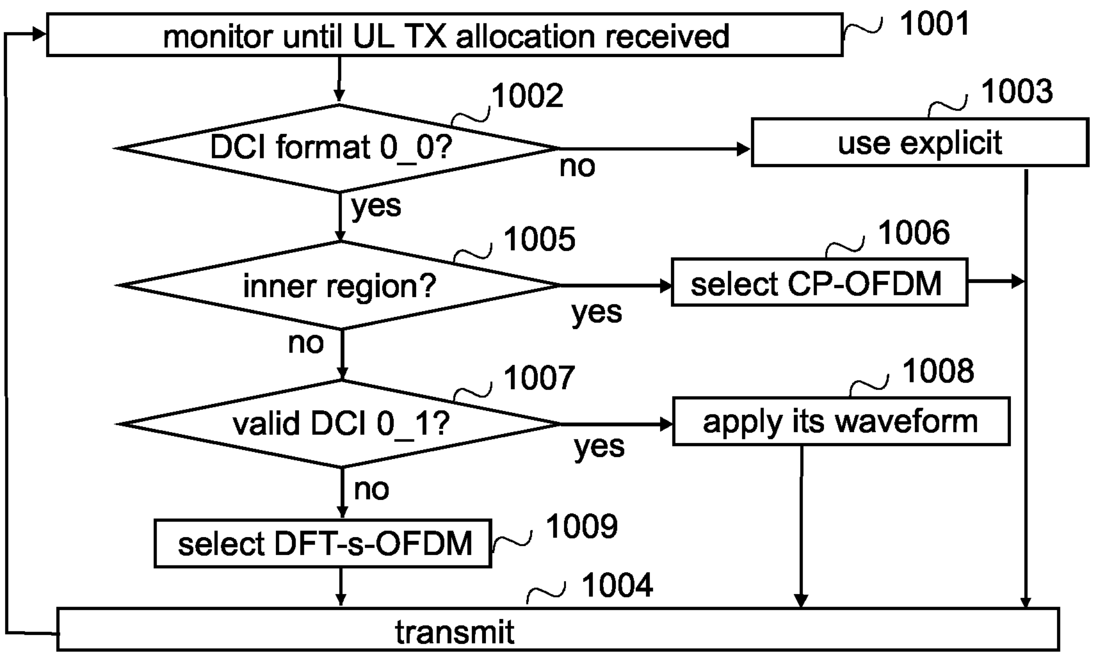

FIG. 10 illustrates an example relating to implementations in which the waveform is determined according to a previous downlink control information. In the illustrated example it is assumed that the implicit determination of the waveform is applied for DCI format 0_0.

Referring to FIG. 10, the apparatus monitors (block 1001), as configured, downlink transmissions until information indicating a frequency domain allocation for an uplink (UL) transmission (TX) is received. If the allocation is not for DCI format 0_0 (block 1002: no), explicit waveform, i.e. the waveform semi-statically configured, is used (block 1003) when data is transmitted in uplink (block 1004). If the allocation is for DCI format 0_0 (block 1002: yes) the apparatus then determines (block 1005), whether the resource block region is the inner region. If the region is the inner region (block 1005: yes), CP-OFDM is selected in block 1006 to be the waveform, which is used when data is transmitted in uplink (block 1004). If the region is not the inner region (block 1005: no), it is determined (block 1007), whether there is a valid DCI format 0_1. A valid DCI format 0_1 is a most recent DCI format 0_1 that is not outdated, and that is available. If there is a valid DCI format 0_1 (block 1007: yes), the waveform given in the valid DCI format 0_1 is used when data is transmitted in uplink (block 1004). If there is no valid DCI format 0_1 (block 1007: no), DFT-s-OFDM is selected in block 1009 to be the waveform, which is used when data is transmitted in uplink (block 1004).

The blocks, related functions, and information exchanges (messages/signals) described above by means of FIGS. 1 to 10 are in no absolute chronological order, and some of them may be performed simultaneously or in an order differing from the given one. Other functions can also be executed between them or within them, and other information may be transmitted, and/or other rules applied. Some of the blocks or part of the blocks or one or more pieces of information can also be left out or replaced by a corresponding block or part of the block or one or more pieces of information. Furthermore, some of the blocks in one example may be combined with another example.

Figure 12:
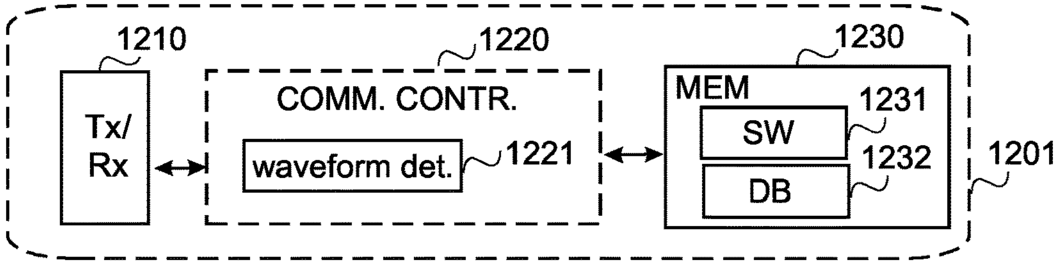
FIGS. 12 to 14 are schematic block diagrams.
Figure 13:
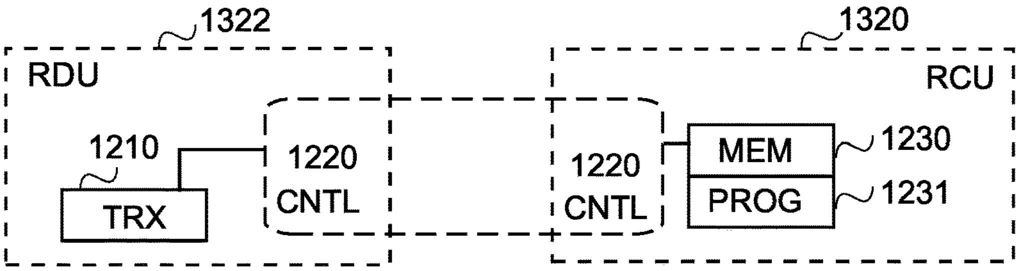
Figure 14:
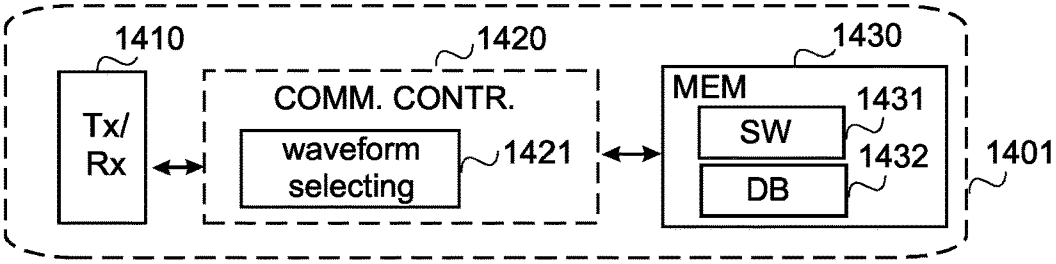

FIG. 12 illustrates an apparatus configured to at least transmit the one or more instructions on how to determine a waveform for at least one uplink transmissions, and to apply then when receiving uplink transmission. FIG. 13 illustrates an apparatus configured to determine, transmit and apply the one or more instructions, and to allocate resources at least for uplink transmissions to the apparatus. In other words, the apparatus of FIG. 13 may implement distributed functionality. FIG. 14 illustrates an apparatus configured to receive the one or more instructions and to apply them to determine a waveform to be used in uplink transmissions from the apparatus. The apparatus 1201, 1401 may comprise one or more communication control circuitry 1220, 1420 such as at least one processor, and at least one memory 1230, 1430 including one or more algorithms 1231, 1431, such as a computer program code (software) wherein the at least one memory and the computer program code (software) are configured, with the at least one processor, to cause the apparatus to carry out any one of the exemplified functionalities of the apparatus described above. Said at least one memory 1230, 1431 may also comprise at least one database 1232, 1432.

Referring to FIG. 12, the one or more communication control circuitry 1220 of the apparatus 1201 comprise at least waveform determining (waveform det.) circuitry 1221 which is configured to perform at least determining waveforms according to embodiments, and possibly the one or more instructions, other configuration information and/or resource allocations. To this end, the waveform determining circuitry 1221 of the apparatus 1201 is configured to carry out at least some of the functionalities of the apparatus described above, e.g., by means of FIGS. 2 to 10, by the apparatus transmitting downlink, receiving uplink, e.g. the apparatus A, using one or more individual circuitries.

Referring to FIG. 12, the memory 1230 may be implemented using any suitable data storage technology, such as semiconductor based memory devices, flash memory, magnetic memory devices and systems, optical memory devices and systems, fixed memory and removable memory.

Referring to FIG. 12, the apparatus 1201 may further comprise different interfaces 1210 such as one or more communication interfaces (TX/RX) comprising hardware and/or software for realizing communication connectivity according to one or more communication protocols. The one or more communication interfaces 1210 may enable connecting to the Internet and/or to a core network of a wireless communications network. The one or more communication interface 1210 may provide the apparatus with communication capabilities to communicate in a cellular communication system and enable communication to different network nodes or elements or terminal devices or user equipments, for example. The one or more communication interfaces 1210 may comprise standard well-known components such as an amplifier, filter, frequency-converter, (de)modulator, and encoder/decoder circuitries, controlled by the corresponding controlling units, and one or more antennas.

In an embodiment, as shown in FIG. 13, at least some of the functionalities of the apparatus of FIG. 12 may be shared between two physically separate devices, forming one operational entity. Therefore, the apparatus may be seen to depict the operational entity comprising one or more physically separate devices for executing at least some of the described processes. Thus, the apparatus of FIG. 13, utilizing such shared architecture, may comprise a remote control unit RCU 1320, such as a host computer or a server computer, operatively coupled (e.g. via a wireless or wired network) to a remote distributed unit RDU 1322 located in the base station. In an embodiment, at least some of the described processes may be performed by the RCU 1320. In an embodiment, the execution of at least some of the described processes may be shared among the RDU 1322 and the RCU 1320.

Similar to FIG. 12, the apparatus of FIG. 13 may comprise one or more communication control circuitry (CNTL) 1220, such as at least one processor, and at least one memory (MEM) 1230, including one or more algorithms (PROG) 1231, such as a computer program code (software) wherein the at least one memory and the computer program code (software) are configured, with the at least one processor, to cause the apparatus to carry out any one of the exemplified functionalities of the apparatus described above, e.g., by means of FIGS. 2 to 10, by the apparatus transmitting downlink, receiving uplink, e.g. the apparatus A.

In an embodiment, the RCU 1320 may generate a virtual network through which the RCU 1320 communicates with the RDU 1322. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

Referring to FIG. 14, the one or more communication control circuitry 1420 of the apparatus 1401 comprise at least waveform selecting circuitry 1421 which is configured to perform determining a waveform to uplink transmissions from the apparatus 1401 according to embodiments. To this end, the waveform selecting circuitry 1421 of the apparatus 1401 is configured to carry out at least some of the functionalities of the apparatus (uplink transmitting apparatus, e.g. the apparatus B) described above, e.g., by means of FIGS. 2 to 10, using one or more individual circuitries.

Referring to FIG. 14, the memory 1430 may be implemented using any suitable data storage technology, such as semiconductor based memory devices, flash memory, magnetic memory devices and systems, optical memory devices and systems, fixed memory and removable memory.

Referring to FIG. 14, the apparatus 1401 may further comprise different interfaces 1410 such as one or more communication interfaces (TX/RX) comprising hardware and/or software for realizing communication connectivity according to one or more communication protocols. The one or more communication interfaces 1410 may enable connecting to the Internet and/or to a core network of a wireless communications network via an access node, for example. The one or more communication interface 1410 may provide the apparatus with communication capabilities to communicate in a cellular communication system and enable communication to different network nodes or elements. The one or more communication interfaces 1410 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 10 may be carried out by an apparatus comprising corresponding means for carrying out at least some of the described processes, for example means per a block or means per a plurality of blocks. It should be appreciated that any of the apparatuses may be implemented by physically distributed devices forming one logical apparatus. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 10 or operations thereof.

Embodiments as described may also be carried out in the form of a computer process defined by a computer program or portions thereof. Embodiments of the methods described in connection with FIGS. 2 to 10 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. The term "nontransitory," as used herein, is a limitation of the medium itself (i.e., tangible, not a signal) as opposed to a limitation on data storage persistency (e.g., RAM vs. ROM). Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:

at least one processor, and at least one memory including computer program code, wherein the at least one processor with the at least one memory and computer program code cause the apparatus to perform:

receiving or comprising one or more instructions relating to uplink transmissions and associating at least resource block regions with waveforms, wherein one resource block region is associated with one waveform of the waveforms, the waveforms comprising at least a first waveform and a second waveform, the resource block regions comprising an inner region and at least one of an outer region or an edge region, wherein the inner region is defined by RBStart, Low≤RBStart≤RBStart, High and LCRB≤ceil(NRB/2), wherein RBStart is a lowest resource block index of allocated resource blocks for uplink transmissions, LCRB is a number of allocated contiguous resource blocks, NRB is a transmission bandwidth configuration expressed in resource blocks, and RBStart, Low and RBStart, High are values dependent on subcarrier spacing and channel bandwidth;

receiving information indicating a frequency domain resource allocation for an uplink transmission;

applying the one or more instructions to determine a waveform for the uplink transmission at least according to a resource block region in the frequency domain resource allocation; and transmitting the uplink transmission using the waveform determined for the uplink transmission, wherein the one or more instructions further comprise monitoring downlink transmissions until information indicating a frequency domain allocation for an uplink transmission is received; and when the information indicating the frequency domain resource allocation for the uplink transmission is not in a downlink control information format 0_0, the apparatus uses the waveform configured semi-statically, and when the information indicating the frequency domain resource allocation for the uplink transmission is in a downlink control information format 0_0 and the resource block region is the inner region the apparatus selects the first waveform, and when the information indicating the frequency domain resource allocation for the uplink transmission is in a downlink control information format 0_0 and there is a valid downlink control information format 0_1 the apparatus uses a waveform indicated in the valid downlink control information format 0_1; and when there is no valid downlink control information format 0_1, the apparatus proceeds as follows:

responsive to determining that there is no valid downlink control information format 0_1, the apparatus determines whether the resource block region is in the inner region, and when the resource block region is the inner region the apparatus selects the first waveform, and when the resource block region is not the inner region the apparatus determines, based on a modulation and coding scheme to be used for the uplink transmission, a threshold, and determines a difference between a power reduction of the first waveform and a power reduction of the second waveform and compares the difference to the threshold, and selects the second waveform in response to the difference being larger than the threshold, and otherwise selects the first waveform.

2. The apparatus of claim 1, wherein the one or more instructions further associate maximum power reductions with said at least the first waveform and the second waveform and wherein the applying comprises determining the waveform for the uplink transmission at least according to the resource block region in the frequency domain resource allocation and the maximum power reductions.

3. The apparatus of claim 1, wherein the one or more instructions further comprise at least one of the following additional instructions for the second waveform, the additional instructions comprising a first threshold for a number of contiguous resource blocks in the frequency domain resource allocation, or a second threshold for a power headroom, and wherein the applying comprises applying the at least one of the additional instructions when determining whether to select the second waveform and, when the resource block region is not the inner region, selecting the second waveform only if a maximum number of allocated contiguous resource blocks is below the first threshold.

4. The apparatus of claim 3, wherein the second threshold is associated with at least one of the first waveform or the second waveform, and wherein the applying comprises selecting the second waveform, when the power headroom is below the second threshold and, when there is no valid power headroom report, selecting a default waveform.

5. The apparatus of claim 1, wherein, when the resource block region is not the inner region the one or more instructions associate at least one third threshold with a difference between a power reduction of the first waveform and a power reduction of the second waveform and wherein the applying comprises determining the waveform for the uplink transmission to be the second waveform in response to the difference being larger than the third threshold.

6. The apparatus of claim 5, wherein the one or more instructions comprises a plurality of third thresholds associated with different modulation schemes, a third threshold being associated with one or more modulation schemes.

7. The apparatus of claim 1, wherein the applying comprises applying the one or more instructions when the information indicating the frequency domain resource allocation for the uplink transmission is for a predetermined radio network temporary identification information.

8. The apparatus of claim 1, wherein the applying comprises applying the one or more instructions when a number of repetitions of a transport block is greater than or equal to a fourth threshold.

9. The apparatus of claim 1, wherein the applying comprises applying the one or more instructions based on previous downlink control information.

10. The apparatus of claim 1, wherein the one or more instructions are included in radio resource control information.

11. An apparatus comprising:

at least one processor, and at least one memory including computer program code, wherein the at least one processor with the at least one memory and computer program code cause the apparatus to perform:

transmitting to at least one receiving apparatus, or comprising for the at least one receiving apparatus, one or more instructions relating to uplink transmissions and associating at least resource block regions with waveforms, wherein one resource block region is associated with one waveform of the waveforms, the waveforms comprising at least a first waveform and a second waveform, the resource block regions comprising an inner region and at least one of an outer region or an edge region, wherein the inner region is defined by RBStart, Low≤RBStart≤RBStart, High and LCRB≤ceil (NRB/2), wherein RBStart is a lowest resource block index of allocated resource blocks for uplink transmissions, LCRB is a number of allocated contiguous resource blocks, NRB is a transmission bandwidth configuration expressed in resource blocks, and RBStart, Low and RBStart, High are values dependent on subcarrier spacing and channel bandwidth;

transmitting to the receiving apparatus information indicating a frequency domain resource allocation for an uplink transmission from the receiving apparatus;

applying the one or more instructions to determine a waveform used by the receiving apparatus for the uplink transmission at least according to a resource block region in the frequency domain resource allocation; and receiving the uplink transmission using the waveform determined for the uplink transmission, wherein the one or more instructions are included in radio resource control information, wherein the one or more instructions further comprise monitoring downlink transmissions until information indicating a frequency domain allocation for an uplink transmission is received; and when the information indicating the frequency domain resource allocation for the uplink transmission is not in a downlink control information format 0_0, the apparatus uses the waveform configured semi-statically, and when the information indicating the frequency domain resource allocation for the uplink transmission is in a downlink control information format 0_0 and the resource block region is the inner region the apparatus selects the first waveform, and when the information indicating the frequency domain resource allocation for the uplink transmission is in a downlink control information format 0_0 and there is a valid downlink control information format 0_1 the apparatus uses a waveform indicated in the valid downlink control information format 0_1, and when there is no valid downlink control information format 0_1, the apparatus proceeds as follows:

responsive to determining that there is no valid downlink control information format 0_1, the apparatus determines whether the resource block region is in the inner region, and when the resource block region is the inner region the apparatus selects the first waveform, and when the resource block region is not the inner region the apparatus determines, based on a modulation and coding scheme to be used for the uplink transmission, a threshold, and determines a difference between a power reduction of the first waveform and a power reduction of the second waveform and compares the difference to the threshold, and selects the second waveform in response to the difference being larger than the threshold, and otherwise selects the first waveform.

12. A method comprising:

receiving or comprising one or more instructions relating to uplink transmissions and associating at least resource block regions with waveforms, wherein one resource block region is associated with one waveform of the waveforms, the waveforms comprising at least a first waveform and a second waveform, the resource block regions comprising an inner region and at least one of an outer region or an edge region, wherein the inner region is defined by RBStart Low≤RBStart≤RBStart High and LCRB≤ceil(NRB/2), wherein RBStart is a lowest resource block index of allocated resource blocks for uplink transmissions, LCRB is a number of allocated contiguous resource blocks, NRB is a transmission bandwidth configuration expressed in resource blocks, and RBStart, Low and RBStart, High are values dependent on subcarrier spacing and channel bandwidth;

receiving information indicating a frequency domain resource allocation for an uplink transmission;

applying the one or more instructions to determine a waveform for the uplink transmission at least according to a resource block region in the frequency domain resource allocation; and transmitting the uplink transmission using the waveform determined for the uplink transmission, wherein the method further comprises monitoring downlink transmissions until information indicating a frequency domain allocation for an uplink transmission is received; and when the information indicating the frequency domain resource allocation for the uplink transmission is not in a downlink control information format 0_0, using the waveform configured semi-statically, and when the information indicating the frequency domain resource allocation for the uplink transmission is in a downlink control information format 0_0 and the resource block region is the inner region selecting the first waveform, and when the information indicating the frequency domain resource allocation for the uplink transmission is in a downlink control information format 0_0 and there is a valid downlink control information format 0_1 using a waveform indicated in the valid downlink control information format 0_1; and when there is no valid downlink control information format 0_1, the apparatus proceeds as follows:

responsive to determining that there is no valid downlink control information format 0_1, determining whether the resource block region is in the inner region, and when the resource block region is the inner region selecting the first waveform, and when the resource block region is not the inner region determining, based on a modulation and coding scheme to be used for the uplink transmission, a threshold, and determining a difference between a power reduction of the first waveform and a power reduction of the second waveform and comparing the difference to the threshold, and selecting the second waveform in response to the difference being larger than the threshold, and otherwise selecting the first waveform.

13. The method of claim 12, wherein the one or more instructions further associate maximum power reductions with said at least the first waveform and the second waveform and wherein the applying comprises determining the waveform for the uplink transmission at least according to the resource block region in the frequency domain resource allocation and the maximum power reductions.

14. The method of claim 12, wherein the one or more instructions further comprise at least one of the following additional instructions for the second waveform, the additional instructions comprising a first threshold for a number of contiguous resource blocks in the frequency domain resource allocation, or a second threshold for a power headroom, and wherein the applying comprises applying the at least one of the additional instructions when determining whether to select the second waveform.

15. The method of claim 14, wherein the second threshold is associated with at least one of the first waveform or the second waveform, and wherein the applying comprises selecting the second waveform, when the power headroom is below the second threshold.

16. The method of claim 12, wherein the one or more instructions associate at least one third threshold with a difference between a power reduction of the first waveform and a power reduction of the second waveform and wherein the applying comprises determining the waveform for the uplink transmission to be the second waveform in response to the difference being larger than the third threshold.

17. A method comprising:

transmitting to at least one receiving apparatus, or comprising for the at least one receiving apparatus, one or more instructions relating to uplink transmissions and associating at least resource block regions with waveforms, wherein one resource block region is associated with one waveform of the waveforms, the waveforms comprising at least a first waveform and a second waveform, the resource block regions comprising an inner region and at least one of an outer region or an edge region, wherein the inner region is defined by RBStart, Low≤RBStart≤RBStart, High and LCRB≤ceil (NRB/2), wherein RBStart is a lowest resource block index of allocated resource blocks for uplink transmissions, LCRB is a number of allocated contiguous resource blocks, NRB is a transmission bandwidth configuration expressed in resource blocks, and RBStart, Low and RBStart, High are values dependent on subcarrier spacing and channel bandwidth;

transmitting to the receiving apparatus information indicating a frequency domain resource allocation for an uplink transmission from the receiving apparatus;

applying the one or more instructions to determine a waveform used by the receiving apparatus for the uplink transmission at least according to a resource block region in the frequency domain resource allocation; and receiving the uplink transmission using the waveform determined for the uplink transmission, wherein the method further comprises monitoring downlink transmissions until information indicating a frequency domain allocation for an uplink transmission is received; and when the information indicating the frequency domain resource allocation for the uplink transmission is not in a downlink control information format 0_0, using the waveform configured semi-statically, and when the information indicating the frequency domain resource allocation for the uplink transmission is in a downlink control information format 0_0 and the resource block region is the inner region selecting the first waveform, and when the information indicating the frequency domain resource allocation for the uplink transmission is in a downlink control information format 0_0 and there is a valid downlink control information format 0_1 using a waveform indicated in the valid downlink control information format 0_1; and when there is no valid downlink control information format 0_1, proceeding as follows responsive to determining that there is no valid downlink control information format 0_1, determining whether the resource block region is in the inner region, and when the resource block region is the inner region selecting the first waveform, and when the resource block region is not the inner region determining, based on a modulation and coding scheme to be used for the uplink transmission, a threshold, and determining a difference between a power reduction of the first waveform and a power reduction of the second waveform and comparing the difference to the threshold, and selecting the second waveform in response to the difference being larger than the threshold, and otherwise selecting the first waveform.

18. A non-transitory computer readable medium encoded with instructions that, when performed by at least one processor, causes at least one of a first functionality or a second functionality to be performed:

wherein the first functionality comprises at least:

receiving or comprising one or more instructions relating to uplink transmissions and associating at least resource block regions with waveforms, wherein one resource block region is associated with one waveform of the waveforms, the waveforms comprising at least a first waveform and a second waveform, the resource block regions comprising an inner region and at least one of an outer region or an edge region, wherein the inner region is defined by RBStart, Low≤RBStart≤RBStart, High and LCRB≤ceil(NRB/2), wherein RBStart is a lowest resource block index of allocated resource blocks for uplink transmissions, LCRB is a number of allocated contiguous resource blocks, NRB is a transmission bandwidth configuration expressed in resource blocks, and RBStart, Low and RBStart, High are values dependent on subcarrier spacing and channel bandwidth;

receiving information indicating a frequency domain resource allocation for an uplink transmission;

applying the one or more instructions to determine a waveform for the uplink transmission at least according to a resource block region in the frequency domain resource allocation; and transmitting the uplink transmission using the waveform determined for the uplink transmission, and wherein the second functionality comprises at least:

transmitting to at least one receiving apparatus, or comprising for the at least one receiving apparatus, the one or more instructions relating to uplink transmissions and associating at least resource block regions with waveforms, wherein one resource block region is associated with one waveform of the waveforms, the waveforms comprising at least a first waveform and a second waveform;

transmitting to the receiving apparatus the information indicating the frequency domain resource allocation for the uplink transmission from the receiving apparatus;

applying the one or more instructions to determine the waveform used by the receiving apparatus for the uplink transmission at least according to the resource block region in the frequency domain resource allocation; and receiving the uplink transmission using the waveform determined for the uplink transmission, wherein the first or second functionality further comprises monitoring downlink transmissions until information indicating a frequency domain allocation for an uplink transmission is received; and when the information indicating the frequency domain resource allocation for the uplink transmission is not in a downlink control information format 0_0, using the waveform configured semi-statically, and when the information indicating the frequency domain resource allocation for the uplink transmission is in a downlink control information format 0_0 and the resource block region is the inner region selecting the first waveform, and when the information indicating the frequency domain resource allocation for the uplink transmission is in a downlink control information format 0_0 and there is a valid downlink control information format 0_1 using a waveform indicated in the valid downlink control information format 0_1; and when there is no valid downlink control information format 0_1, proceeding as follows:

responsive to determining that there is no valid downlink control information format 0_1, determining whether the resource block region is in the inner region, and when the resource block region is the inner region selecting the first waveform, and when the resource block region is not the inner region the apparatus determines, based on a modulation and coding scheme to be used for the uplink transmission, a threshold, and determines a difference between a power reduction of the first waveform and a power reduction of the second waveform and comparing the difference to the threshold, and selecting the second waveform in response to the difference being larger than the threshold, and otherwise selecting the first waveform.

* * * * *